Patented Jan. 27, 1942

2,271,272

UNITED STATES PATENT OFFICE 2,271,272

PROCESS FOR THE MANUFACTURE OF KEEPABLE FISH PRODUCTS

Hjalmar Minde, Minde, near Bergen, Norway, assignor of one-half to Eirik Heen, Bergen, Norway No Drawing. Application October 3, 1939, Serial No. 297,768. In Norway June 1, 1933

7 Claims. (Cl. 99—111)

This invention has for its object a process for the manufacture of a stable fish product in the form of strips, granules and other bodies of small dimensions similar to macaroni, vermicelli and the like.

According to the invention products of this type are produced by heating and pulping fish with or without added substances, shaping the obtained pulp into bodies of suitable size and shape and finally drying these bodies of pulped fish so as to obtain products sufficiently low in moisture to be capable of being stored.

It is an important feature of this process that the fish flesh is heated before or during the pulping (or "emulsifying") operation because it has been found that satisfactory results cannot be obtained if such heating of the material is omitted. The temperature to which the fish flesh is heated is preferably between about 60° and 100° C. By varying the temperature of the heat treatment it is possible to alter the consistency and other characteristics of the final product.

EXAMPLES

I

Cleansed raw or cooked fish is ground and finely disintegrated (with or without such added foreign substances as may be desirable to improve the taste, appearance or nutritive value of the product) and is thereupon introduced into a pan with indirect heating arrangement and stirring means. The mass is stirred and heated to a temperature between about 60° C. and 100° C. It is to be noted that a material heated to comparatively low temperature (about 60° C. for example) will yield a product of harder consistency than a material heated to higher temperature. The degree of coagulation may also be varied and controlled by adding raw (uncooked) fish to cooked fish. In this way the consistency of the final product may be adjusted. This is a feature of great practical importance.

The agitator in the heating pan is operated at a sufficient speed to bring about "emulsification" of the material.

The pulp resulting from this treatment is ejected through nozzles of suitable shape directly onto supporting plates, which are then introduced into drying chambers, where the products are subjected to the influence of circulating air having a temperature of about 20° C.

The dried products are then packed and stored. They are capable of being stored for half a year or more according to the conditions of storage.

The products are ready for consumption after 3–5 minutes cooking and may be used to prepare various dishes, puddings, etc.

II

Cleansed fish is ground when in an uncooked condition and is thereupon heated to 60° while being stirred. Such foreign additions as may be desirable are added at this stage. The resulting pasty mass is then further treated as explained in Example I.

III

Cleansed fish is cooked at 100° C., whereupon a less quantity of raw fish as well as the required foreign additions is mixed with the cooked fish. The mixture is ground, shaped and dried as above explained.

IV

The raw fish flesh, with or without added bones and skin in minor quantity is ground and heated by being stirred up to about 100° C. The temperature is so controlled as to obtain the desired consistency of the resulting pulp. The pulp is ground between rollers so as to obtain a homogeneous paste.

Such additions as are suited to impart to the product the desired character are introduced and mixed with the fish pulp at this stage of the treatment. Such added matter may e. g. have the effect of altering the flavor or taste of the product or to further alter the consistency or appearance of the final product. Small proportion of casein added to the fish pulp will result in a product of harder or more solid product while e. g. gelatine as an addition will result in a more soft product. The consistency may also be modified by various changes in conditions of operation and relative proportions of the raw materials and foreign additions employed.

The fish pulp with the various additions employed is subjected to a sufficiently long-lasting and powerful stirring as to obtain a pulp having the character of an emulsion.

The resultant pulp is thereupon forced through suitable orifices and placed on supporting discs. The means employed for shaping the pulp are of the same type as usually used in macaroni or vermicelli factories.

As will be understood the products according to the invention may be produced from pure fish flesh only, but various other materials may be added to the fish flesh in the course of the treatment.

Suitable additions are fish skin and fish bones, gelatine, casein, starch materials, such as cereal flour, potatoes and the like.

The pulp may be shaped into bodies of any shape, for example similar to any of the well known commercial macaroni products, (fidellini, vermicelli, lasagnelli, taglioni, stellure, andarini, millefanti, etc.).

Before the shaped fish pulp is subjected to the final drying treatment it may sometimes be suitable to subject same to a sterilizing treatment to avoid bacterial activity in the interior of the pulp.

A subsequent drying of the bodies of pulp is suitably carried into effect at temperatures of about 20° C. by the aid of air circulating in contact with the fish pulp.

Products according to the present invention may be produced also from other sea animals than fish, e. g. from lobsters, crabs, crayfish, shrimps as the main constituent of the pulp to be shaped and dried, or as a minor constituent of the raw material.

I claim:

1. A process for the manufacture of a stable food product rich in albumens, comprising the steps of preparing a homogeneous paste comprising finely disintegrated fish meat in an incompletely coagulated condition, shaping the pulp into products of comparatively small dimensions, and subjecting the resultant fish paste products to drying.

2. A process according to claim 1 in which the drying of the bodies of the fish paste is effected at low temperature with the aid of air at a temperature of about 20° C.

3. A process according to claim 1, in which the fish meat is converted into a homogeneous paste by continued agitation of the fish at a temperature of between 60 and 100° C.

4. A process according to claim 1, in which uncooked fish is heated to between 60 and 100° C. and while in a heated condition subjected to continued agitation until the resulting pulp has the character of an emulsion.

5. A process according to claim 1, in which the paste to be shaped and dried is prepared by mixing cooked with raw fish meat.

6. A process according to claim 1, in which fish skin is added to the fish meat to be converted into a homogeneous paste for shaping and drying.

7. A process according to claim 1, in which the homogeneous paste to be shaped and dried contains added albumens of the group which consists of casein and gelatine.

HJALMAR MINDE.